(12) United States Patent
Wang et al.

(10) Patent No.: US 7,971,145 B2
(45) Date of Patent: Jun. 28, 2011

(54) SYSTEMS AND METHODS FOR ADAPTING SERVICE INTERFACE BEHAVIORS

(75) Inventors: Kenneth Wang, New Farm (AU); Murray L. Spork, San Francisco, CA (US); Marlon G. Dumas, New Farm (AU)

(73) Assignee: SAP AG, Walldorf (DE)

( * ) Notice: Subject to any disclaimer, the term of this patent is extended or adjusted under 35 U.S.C. 154(b) by 151 days.

(21) Appl. No.: 11/438,502

(22) Filed: May 22, 2006

(65) Prior Publication Data

US 2008/0065994 A1 Mar. 13, 2008

(51) Int. Cl.
*G06F 3/00* (2006.01)
*G06F 15/16* (2006.01)

(52) U.S. Cl. ........................................ 715/746; 709/246
(58) Field of Classification Search .................. 715/746; 709/246
See application file for complete search history.

(56) References Cited

U.S. PATENT DOCUMENTS

| | | | |
|---|---|---|---|
| 6,179,489 B1 * | 1/2001 | So et al. | 718/102 |
| 6,407,753 B1 * | 6/2002 | Budinsky et al. | 715/764 |
| 6,496,202 B1 * | 12/2002 | Prinzing | 715/762 |
| 6,753,889 B1 * | 6/2004 | Najmi | 715/784 |
| 6,816,865 B2 * | 11/2004 | O'Brien et al. | 707/100 |
| 6,959,340 B1 * | 10/2005 | Najmi | 709/246 |
| 7,076,728 B2 * | 7/2006 | Davis et al. | 715/205 |
| 7,143,190 B2 * | 11/2006 | Christensen et al. | 709/246 |
| 7,269,795 B2 * | 9/2007 | Whittenberger | 715/764 |
| 2003/0195765 A1 * | 10/2003 | Sehgal et al. | 705/1 |
| 2004/0176967 A1 * | 9/2004 | Whittenberger | 705/1 |
| 2005/0080805 A1 * | 4/2005 | Haeberle et al. | 707/102 |
| 2006/0168536 A1 * | 7/2006 | Portmann | 715/762 |

OTHER PUBLICATIONS

Dumas et al., "Adapt or Perish: Algebra and Visual Notation for Service Interface Adaption," Oct. 2006, pp. 65-80, vol. 4102, Springer-Verlag Berlin Heidelberg.
Dumas et al., "Interface Adaption: Bridging Collaboration Agreements and Web Services," Nov. 18, 2005, pp. 1-31, Brisbane, Australia.
Anonymous, "CEBPI Colloquium: Dr. Marlon Dumas Presents on BPM and SOA". Internet article, Nov. 18, 2005, please see below for URL: http://howe.stevens.edu/news-events/hotnews%5Btt_news%5D=77&tx_ttnews%5BbackPid%5D=905&cHash=d039387dfl>.
Anonymous, "Howe School of Technology Management: Past Research Colloquia", Internet article, Oct. 30, 2007, please see below for URL: http://howe.stevens.edu/news-events/howe-school-events/past-research-colloquia/>.
Alonzo, "CS Availability Container", ADAPT: Middleware Technologies for Adaptive and Composable Distributed Components, IST-2001-37126.
Altenhofen, "An Abstract Model for Process Mediation", ICFEM 2005, LNCS 3785, pp. 81-95, 2005.
Brogi, "Formalizing Web Service Choreographies", WS-FM 2004, Preliminary Version, pp. 1-20.

(Continued)

*Primary Examiner* — William L Bashore
*Assistant Examiner* — David Phantana-angkool
(74) *Attorney, Agent, or Firm* — Fountainhead Law Group P.C.

(57) ABSTRACT

In one embodiment, the present invention includes a computer-implemented method of adapting software component interfaces by providing a user interface for specifying a provided interface, a required interface and interface operators. In another embodiment the present invention includes a computer-implemented method of adapting interfaces comprising receiving an adapter specification, receiving a plurality of communication actions from a first software component, transforming one or more of the communication actions in accordance with predefined interface operations; and sending transformed communication actions to a second software component.

18 Claims, 20 Drawing Sheets

OTHER PUBLICATIONS

Cimpian, "WSMX Process Mediation Based on Choreographies", BPM 2005 Workshops, LNCS 3812, 2006, pp. 130-143.

Guo, "A Component-Based Systems Development Approach", *Transaction of the SDPS,* Mar. 2002, vol. 6, No. 1, pp. 103-115.

Hurault, "Mathematical Service Trading Based on Equational Matching", Technical Report TR/TLSE/05/04—Preliminary Version, pp. 1-20.

Penix, "Rebound: A Framework for Automated Component Adaptation", WISR '99 Position Paper, pp. 1-8.

Reussner, "Automatic Component Protocol Adaptation With the CoConut/J Tool Suite", *Future Generation Computer System 19* (2003), pp. 627-639.

Yellin, "Protocol Specifications and Component Adaptors", ACM Transactions on Programming Language and Systems, vol. 19, No. 2. Mar. 1997, pp. 292-333.

Altenhofen, "A high-Level specification for Mediators (Virtual Providers)", pp. 1-15, BPM 2005, 1st Int'l Workshop on Web Service Choreography and Orchestration for Business Process Management; Nancy, France, Sep. 5, 2005.

Banatallah, "Developing Adapters for Web Services Integration." Procs of CAiSE 2005. Porto, Portugal. Jun. 2005.

Schmidt, "Generating Adapters for Concurrent Component Protocol Synchronisation," pp. 1-17. Proc. of FMOODS'02, 2002.

* cited by examiner

XML Serialization
(Adaptation Expression)

```
txr002_Scatter.xml - Notepad
File Edit Format View Help
<HEADER>
    <INTERFACE type="provided" source="pi0002.xml" />          — 1603
    <INTERFACE type="required" source="ri0002.xml" />          — 1604
</HEADER>
<BODY>
    <TRANSFORM operator="SCATTER">
        <SOURCES>
            <SOURCE type="SOAP" name="getOrderInfo" />         — 1605
        </SOURCES>
        <TARGETS>
            <TARGET type="SOAP" name="getPODate" />
            <TARGET type="SOAP" name="getPOAmt" />
        </TARGETS>
        <FUNCTION type="XSLT" source="xsl0002a01.xsl"/>
    </TRANSFORM>
    <TRANSFORM operator="FLOW">
        <SOURCES>
            <SOURCE type="SOAP" name="PODateResponse" />       — 1606
        </SOURCES>
        <TARGETS>
            <TARGET type="SOAP" name="orderDateInfoResponse" />— 1607
        </TARGETS>
        <FUNCTION type="XSLT" source="xsl0002a02.xsl" />
    </TRANSFORM>
    <TRANSFORM operator="FLOW">
        <SOURCES>
            <SOURCE type="SOAP" name="POAmtResponse" />        — 1608
        </SOURCES>
        <TARGETS>
            <TARGET type="SOAP" name="orderAmtInfoResponse" /> — 1609
        </TARGETS>
        <FUNCTION type="XSLT" source="xsl0002a04.xsl" />
    </TRANSFORM>
</BODY>
```

SYSTEMS AND METHODS FOR ADAPTING SERVICE INTERFACE BEHAVIORS

BACKGROUND

The present invention relates to software interfaces, and in particular, to systems and methods for adapting interfaces, such as software service interfaces.

There is an increasing acceptance of Service-Oriented Architectures (SOAs) as a paradigm for integrating software applications within and across organizational boundaries. In SOAs, independently developed and operated applications are made available as services that may be interconnected with one another using standardized protocols and languages. One of the cornerstones of SOAs is the principle that each service operates according to an interface. In a broad sense, a service's interface captures the types of messages that the service can produce and consume, the message encodings and transfer protocols that the service supports or requires, and the dependencies between message exchanges. Armed with such information, developers can build systems that draw upon functionality from multiple services and make them collaborate in complex manners.

Services may be reused across development projects, development teams, or even across organizational boundaries. It is thus normal to expect that services will be reused in contexts for which they were not originally designed. When seeking to reuse an existing service in a new context, it often happens that the interface that the service provides does not match the interface that it is required to provide in that context. For example, consider a procurement service which, after sending an order to an order management service, expects to receive one and only one response. Now, consider the case where this procurement service is required to engage in a collaboration wherein the order management service may send a first response acknowledging the order and accepting or rejecting a subset of its line items, and later on send zero, one or more additional updates to accept or reject the remaining line items as their availability is determined. This interface mismatch is illustrated in FIG. 1. The figure shows an interface provided by an existing service (the "provided" interface) and the interface that this service is expected to provide in a new context (the "required" interface). The "provided" interfaces shown in this example may be a fragment of an order management process implemented in XML Common Business Library (xCBL), which is an XML component library for business-to-business e-commerce, or in Universal Business Language (UBL), which is a generic XML interchange format for business documents. On the other hand, the "required" interface may be a RosettaNet standard interface process.

Cast more generally, service reuse leads to situations where a service is required to participate in multiple collaborations such that in each of them a different interface is required from it. These "required interfaces" may correspond to different message granularities, message types, and dependencies between message exchanges. Thus, service reuse calls for mechanisms to mediate between the interface natively provided by a service and the various interfaces that are required from it. This problem is sometimes referred to as service interface adaptation.

Service interfaces can be described from a structural perspective, where the focus is on message types, and from a behavioral perspective, where the focus is on control dependencies between message exchanges. The problem from the structural perspective is relatively well-understood. Current approaches for adapting structural mismatches in interfaces rely on transformation definition languages (e.g. XSLT) and schema mapping tools. In comparison, the problem of interface adaptation from a behavioral perspective is still open.

Accordingly, one problem that arises is how to enable a service implementing a given behavior (e.g. the behavior on the left-hand side of FIG. 1) to participate in interactions where a different behavior, yet the same functionality, is required from it (e.g. the behavior on the right-hand side of FIG. 1). Traditionally, this problem is addressed by developing adaptors using programming languages. However, these adaptors are costly to develop and to maintain. Furthermore, the use of programming languages makes it difficult to check that these adaptors correctly implement the intended adaptation logic or that they do not create deadlocks.

Thus, there is a need for improved techniques of adapting interfaces. The present invention solves these and other problems by providing improved systems and methods for adapting interface behaviors.

SUMMARY

In one embodiment, the present invention includes a computer-implemented method of adapting interfaces comprising receiving an adapter specification, receiving a plurality of communication actions from a first software component, transforming one or more of the communication actions in accordance with predefined interface operations, and sending transformed communication actions to a second software component, wherein the adapter specification specifies one or more predefined interface operations to be used in transforming one or more corresponding communication actions.

In another embodiment, the present invention includes a computer-implemented method of adapting interfaces comprising displaying at least a portion of a first interface in a graphical user interface, the first interface including a first plurality of communication actions, displaying at least a portion of a second interface in a graphical user interface, the second interface including a second plurality of communication actions, displaying a plurality of predefined interface operators for adapting communication actions between the first interface and the second interface, wherein a user selects one or more predefined interface operators and couples one or more of the selected predefined interface operators between one or more particular communication actions in the first interface and one or more particular communication actions in the second interface.

In another embodiment, the present invention includes a computer system including interface adapter software comprising an adapter specification, and an adapter software component to receive the adapter specification, and in accordance therewith, modify one or more communication actions using predefined interface operations, wherein the adapter specification specifies one or more predefined interface operations to be used in modifying one or more corresponding communication actions.

In one embodiment, a first software component includes a first interface and a second software component includes a second interface, and wherein an adapter specification programs an adapter software component to provide communications between the first and second software components.

In one embodiment, an adapter specification specifies one or more of a flow operation, a gather operation, hide operation, a scatter operation, a collapse operation, a burst operation, or a hide operation between one or more communication actions between the first software component and the second software component.

In one embodiment, the first software component and the second software component are software services.

In one embodiment, an adapter specification is generated from one or more of a flow operator, a gather operator, hide operator, a scatter operator, a collapse operator, a burst operator, or a hide operator specified between one or more first interface actions and one or more second interface actions, or one or more other operators.

In one embodiment, the interface operators are cascaded.

The following detailed description and accompanying drawings provide a better understanding of the nature and advantages of the present invention.

BRIEF DESCRIPTION OF THE DRAWINGS

FIG. 16 is an example representation of adapter expressions according to one embodiment of the present invention.

DETAILED DESCRIPTION

Described herein are techniques for adapting service interfaces. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In one embodiment, the present invention uses declarative approach to service interface adaptation that places emphasis on the behavioral perspective and can coexist with existing approaches to structural interface adaptation. Embodiments of the invention may comprise a visual notation and the use of interface operators that can be combined to create a map between two different interfaces. For example, visual notation may be used as a declarative technique for developers to map between required and provided interfaces. The implementation may provide a semantic for the notation, capture criteria under which elements from an interface can be mapped to elements of another interface, and may further provide a basis for executing mappings. In one embodiment, an engine mediates between pairs of "provided-required" interfaces. A communication action transformation engine may intercept, buffer, transform, and/or forward messages according to interface operators embodied in an adapter specification. The engine may carry out corresponding operations specified in the adapter specification, for example.

Figure 1:
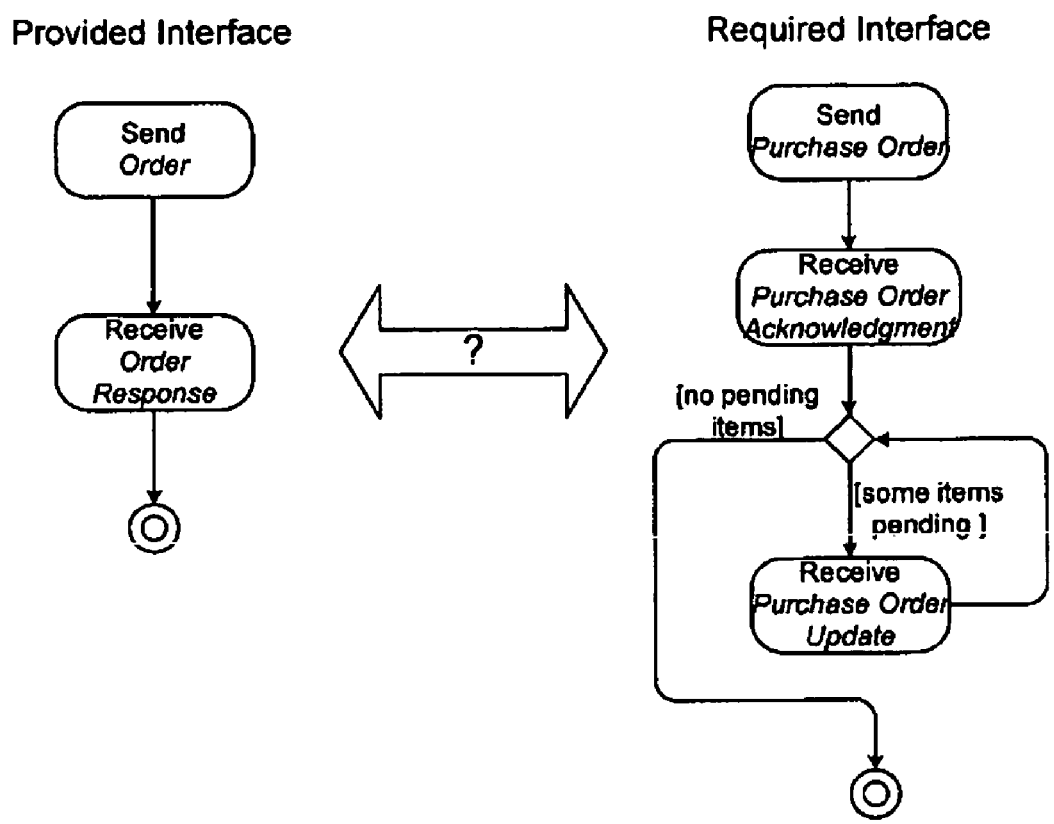
FIG. 1 illustrates a distributed computing architecture.
Figure 2:
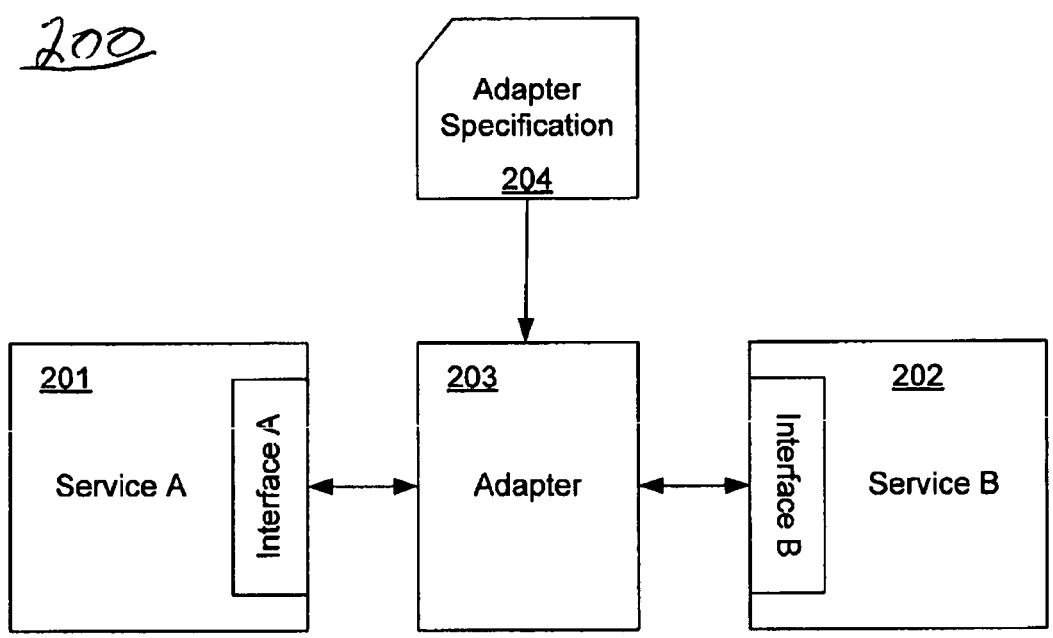
FIG. 2 illustrates one embodiment of the present invention.

FIG. 2 illustrates one embodiment of the present invention. System 200 includes a first software component service 201 and a second software component. Example software components may include software services, such as web services, for example. In this example, component 201 may have a certain provided interface, and component 202 may have a certain required interface. Each interface may be designed to send or receive particular communication actions, such as messages, for example. Communication actions (or just "actions") are interactions, transactions, or steps between interfaces. A component may perform communication actions as part of interfacing with another component. Example communication actions may include messages sent or received during steps in an interface. In order for the two components to interact, the behavior of the interfaces must match. In this example, the behavior of the provided interface ("Interface A") and the required interface ("Interface B") do not match. According to one embodiment of the present invention, an adapter 203 is provided between the two interfaces to allow the two software components to interact. The adapter may be a software component for performing operations necessary to arbitrate between component 201 and component 202. For example, component 203 may receive an adapter specification. The adapter specification may specify one or more predefined interface operations to be used in transforming communication actions between components 201 and 202. When adapter 203 is configured, it may receive a plurality of communication actions from component 201, transform the communication actions in accordance with predefined interface operations described in more detail below, and send transformed communication actions to component 202. Similarly, adapter 203 may receive a plurality of communication actions from component 202, transform the communication actions in accordance with predefined interface operations, and send transformed communication actions to component 201.

Figure 3:
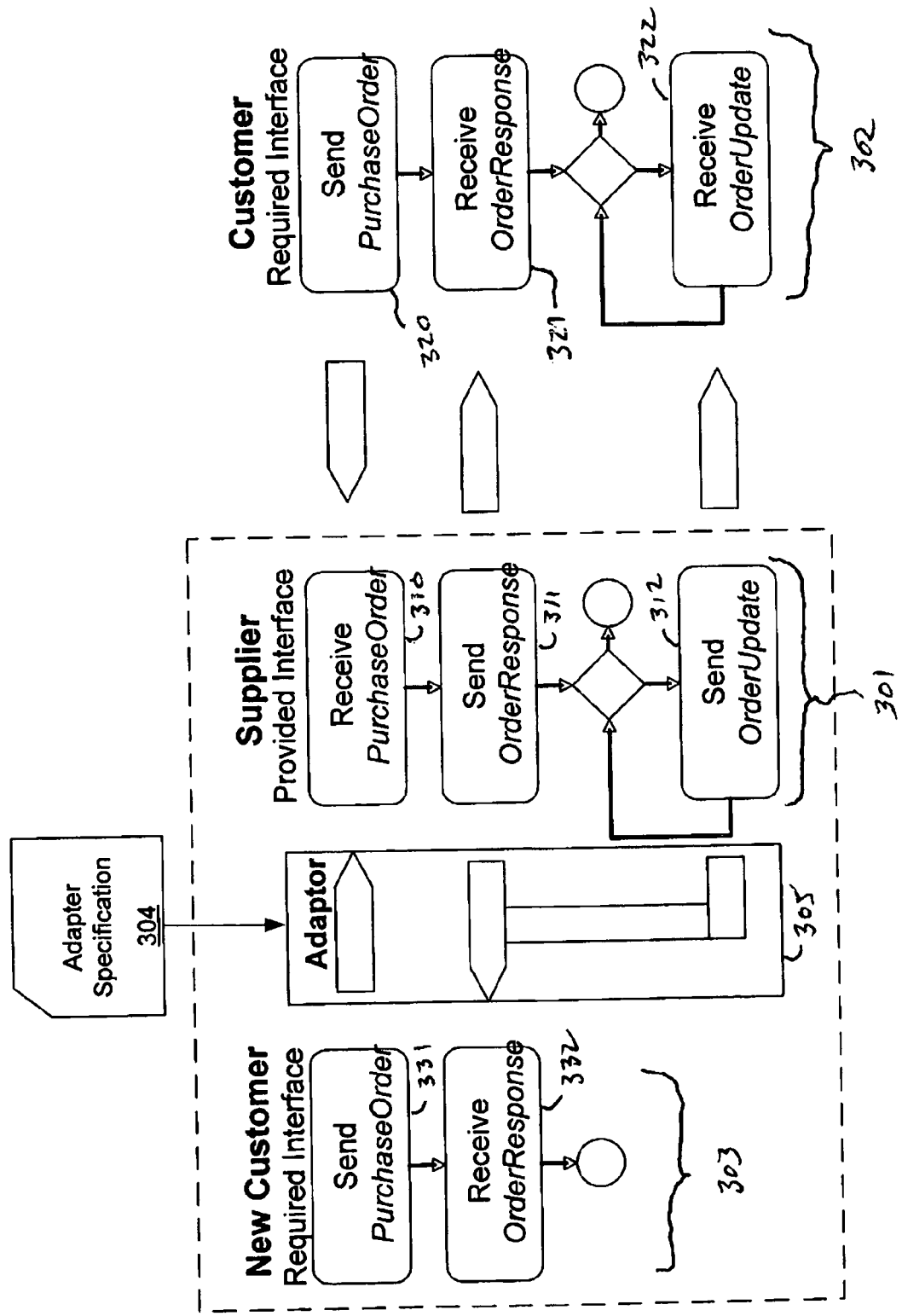
FIG. 3 illustrates one embodiment of adapting interfaces.

FIG. 3 illustrates an example of adapting interfaces. In this example, a supplier may provide an interface 301 including several communication actions. First, interface 301 is expecting to receive a Purchase Order at 310. After receiving a Purchase Order, interface 301 sends an Order Response at 311. Next, interface 301 sends multiple Order Updates. A first customer may have software that includes a required interface 302 that matches the supplier's provided interface 301. Thus, interface 302 may first send a Purchase Order at 320. Next, interface 302 will expect to receive an Order Response at 321.

Finally, at 322, interface 302 expects to receive multiple Order Updates. In this example, a new customer may provide an interface 303 that is different from the supplier's provided interface. For example, interface 303 may first send a Purchase Order at 331 and receive an Order Response at 332, which would work with the required interface of 301. However, interface 303 has no mechanism for receiving Order Updates. Accordingly, adapter 305 is used to mediate between interface 301 and 303, and provide operations, as specified in adapter specification 304, which allow the two interfaces to work together. Adapter 305 may implement a variety of operations that translate an input interface into an output interface for adapting interfaces.

Figure 4:
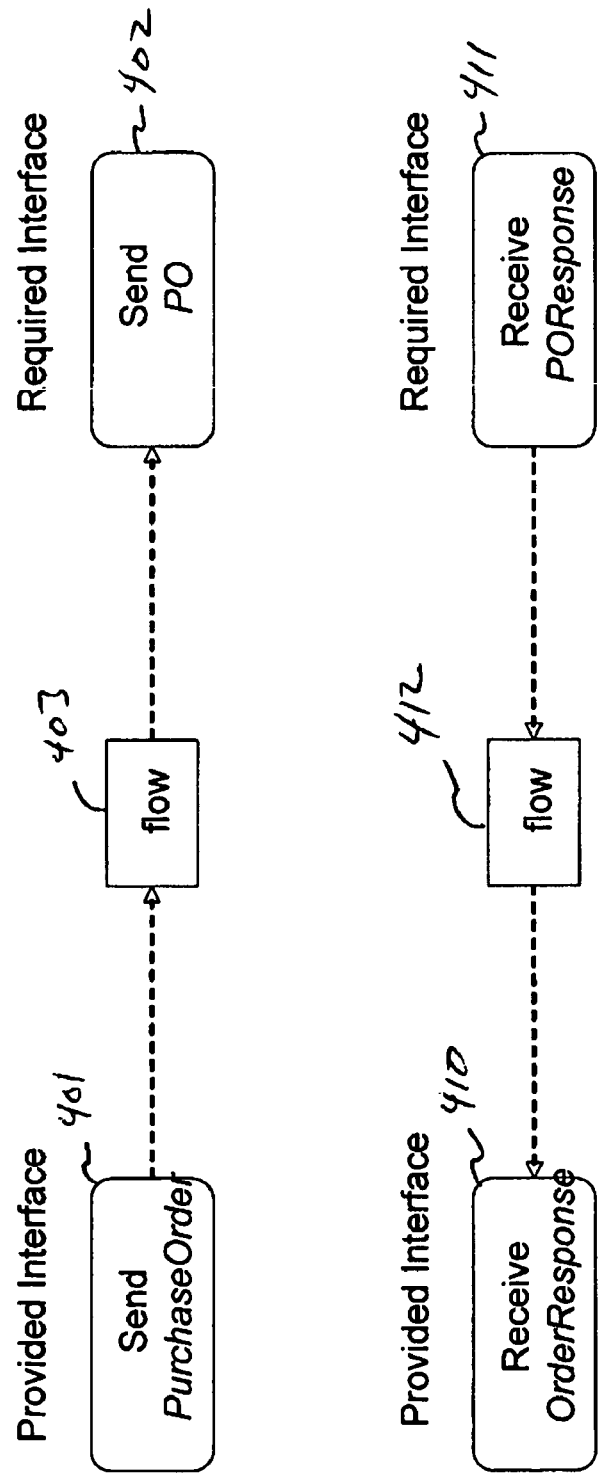
FIG. 4 illustrates a flow operation according to one embodiment of the present invention.

Adapters may implement a variety of operations depending on the types of interfaces being adapted. FIG. 4 illustrates a flow operation according to one embodiment of the present invention. The flow operation modifies an action defined in the source interface into another action in the target interface. For example, a provided interface 401 may send "PurchaseOrder," but a required interface 402 may require a "PO." The mismatch may result in the receiving system not recognizing the incoming action. Thus, a flow operation 403 may be used to transform the communication action from "Send PurchaseOrder" to the required "Send PO." As another example, a provided interface 410 may expect to receive an "OrderResponse," but the required interface may require receiving a "POResponse." Accordingly, a flow operator 412 may be used to transform a received "POResponse" into the provided "OrderResponse" to correct for the interface mismatch. In one embodiment, a flow operation converts message of one type to a message of another type. The actions output by the flow operation for a given input may be specified in the adapter specification mentioned above, for example.

Figure 5:
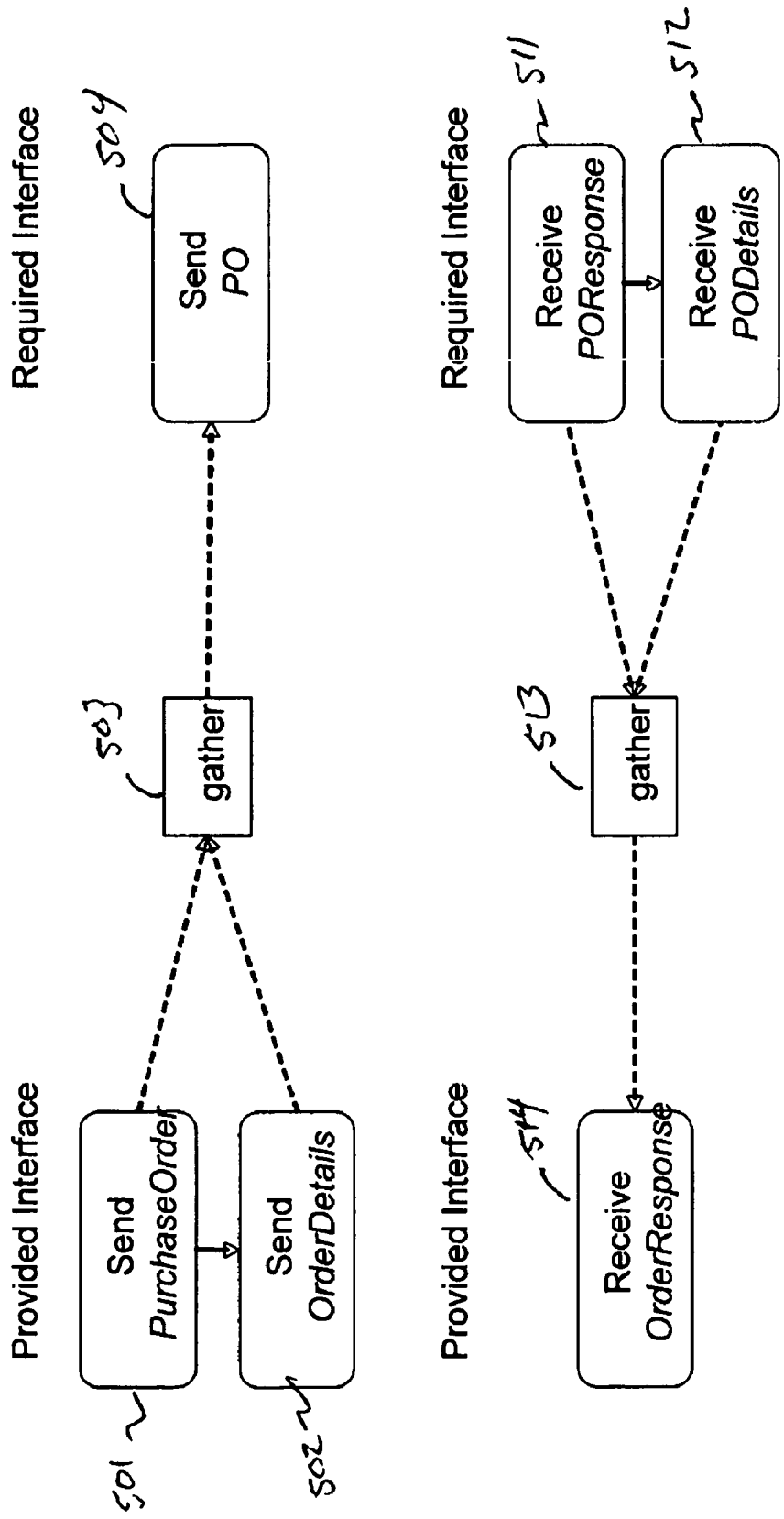
FIG. 5 illustrates a gather operation according to one embodiment of the present invention.

FIG. 5 illustrates a gather operation according to one embodiment of the present invention. The gather operation generates a single action in response to receiving a specified plurality of actions. A gather operation may take as input N specified actions from one interface and generate another action to replace the N input actions. For example, in one embodiment, the specified plurality of actions may be aggregated by the gather operation to produce the output action. In one embodiment, the gather operation receives consecutive actions having the same directionality. For example, multiple consecutive receives may be gathered into a single receive, or multiple consecutive sends may be gathered into a single send. The gather operation is illustrated in FIG. 5. For example, a provided interface may include a "Send PurchaseOrder" step 501 and a separate "Send OrderDetails" step 502. However, the required interface may only expect to receive a "PO," including both the purchase order and details. Thus, the gather operation 503 may receive the "Purchase Order" and the "Order Details" and generate a single action, "Send PO," that can be received by the required interface. Similarly, the gather operation may be used to receive multiple actions and combine the actions for reception by the provided interface. For example, a required interface may include an action for sending a purchase order response and another action for sending the details of the purchase order. Thus, the required interface would need a "Receive POResponse" step 511 and a "Receive PODetails" step 512. However, the provided interface may only include a single action "Receive OrderResponse" 514. Thus, a gather operation 513 may be used to receive the "POResponse" and the "PODetails," and generate a single "OrderResponse" that can be received by the provided interface. The action output by the gather operation for a given set of inputs may be specified in the adapter specification mentioned above, for example.

Figure 6:
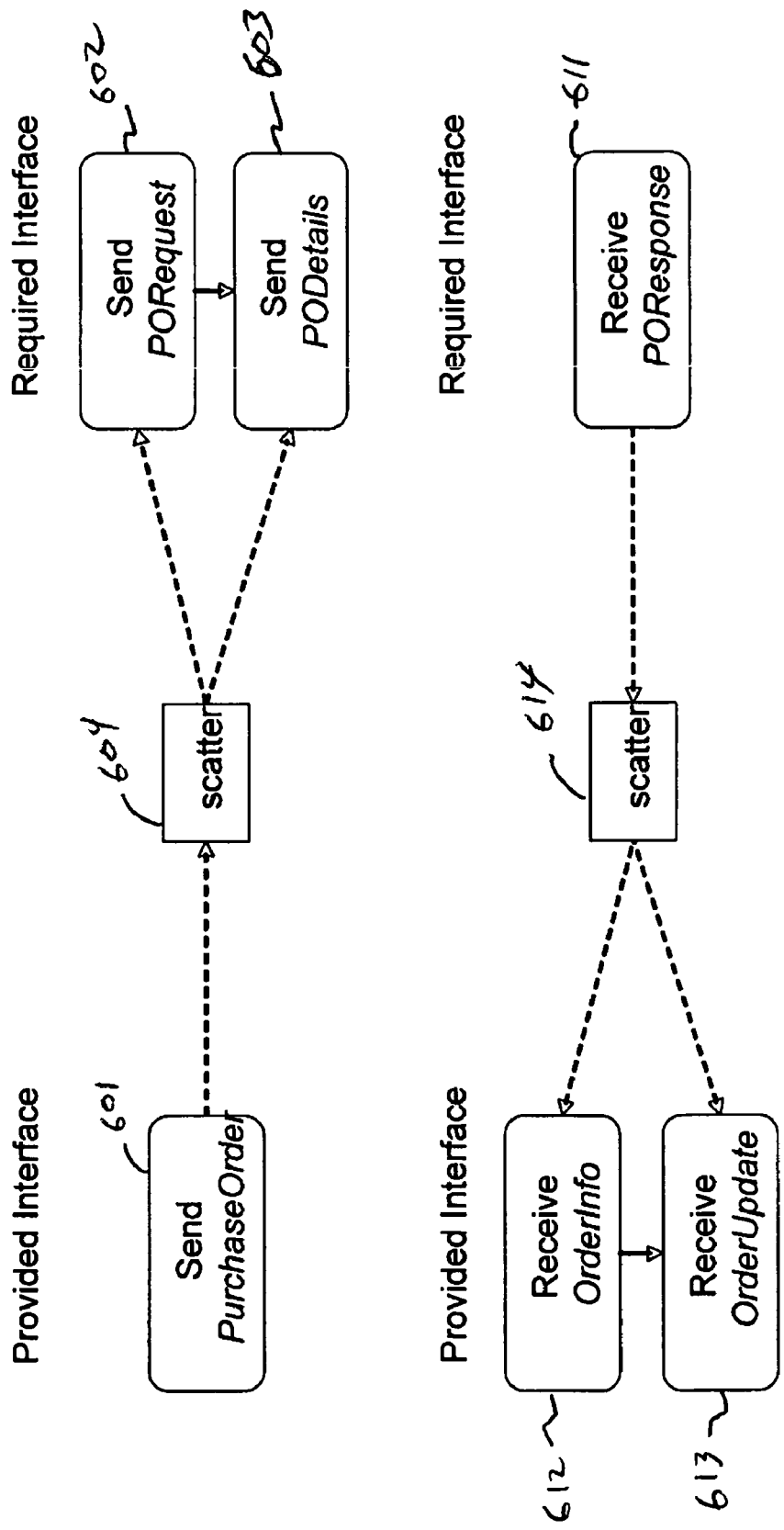
FIG. 6 illustrates a scatter operation according to one embodiment of the present invention.

FIG. 6 illustrates a scatter operation according to one embodiment of the present invention. The scatter operation translates a single action in one interface into multiple actions in another interface. A scatter operation receives a single action and that action into multiple actions. The actions generated in response to the input action may be specified differently for different implementations of the scatter operation (e.g., in the adapter specification). For example, a provided interface may include a "Send PurchaseOrder" step 601, but a required interface may expect to receive a "PORequest" and "PODetails" as two separate actions. Thus, the required interface should have a "Send PORequest" step 602 and a "Send PODetails" step 603. Scatter operation 604 may be used to receive the "Send PurchaseOrder" action and provide the "Send PORequest" step 602 and "Send PODetails" step 603. Similarly, if the provided interface expects to receive "OrderInfo" at step 612 and receive "OrderUpdate" as a separate action at step 613, then a required interface that only sends a "POResponse" will not work. The scatter operation 614 may be used to provide the required interface with a single action for receiving "POResponse." Scatter operation 614 receives the required "POResponse," and provide the "Received OrderInfo" at 612 and separately provide the "Receive OrderUpdate" at 613. The output of the scatter operation for a given input may be specified in the adapter specification mentioned above, for example.

Figure 7:
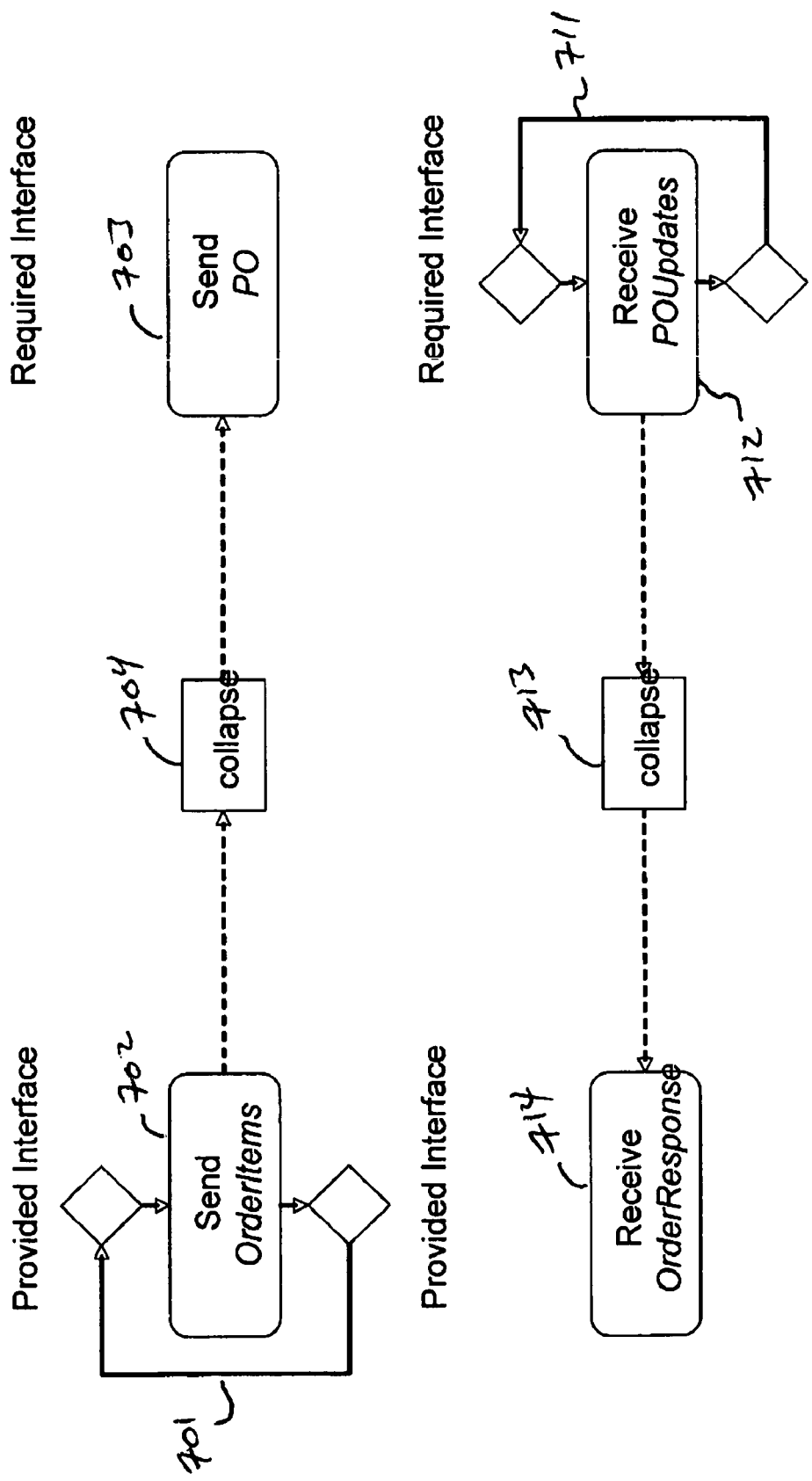
FIG. 7 illustrates a collapse operation according to one embodiment of the present invention.

FIG. 7 illustrates a collapse operation according to one embodiment of the present invention. The collapse operation combines a stream of messages into a single message. This operator may be used when a stream of messages results in multiple instances of the same communication action. For example, the collapse operation may receive multiple instances of an action. The action may be embedded in a process flow with one or more actions preceding or following it, and the action may be performed multiple times in accordance with the flow. Each instance of the action may be received by the collapse operation. In one embodiment, after the particular action is outside the reach of the process flow (i.e., when an action cannot be performed again as part of a given flow), then the collapse operation may perform a single instance of the action. For example, a provided interface may include a loop 701 or other process flow where an action "Send OrderItems" 702 is performed multiple times. However, a required interface may only expect one occurrence of "Send PO" 703. Thus, a collapse operation 704 replaces all occurrences of "Send OrderItems" with a single occurrence of "Send PO." Similarly, the execution of a process flow in a required interface may send multiple "Receive POUpdates." According, a required interface may require a "Receive POUpdates" step 712 as part of a process flow or loop 711, for example. However, the provided interface 714 may only expect to receive a single "OrderResponse." Thus, collapse operation 713 may be used to accumulate the received PO updates from the input interface and provide a single order response to the output interface. The output of the collapse operation for a given set of inputs may be specified in the adapter specification mentioned above, for example.

In one embodiment, the collapse operation may (i) track the progress of the input and output interfaces; (ii) perform a reachability analysis each time the input interface changes state (i.e., determine if the input interface action will be performed again); (iii) once the action to be collapsed is no longer reachable from the current state, combine the set of accumulated actions; and (iv) dispatch the combined action when the output interface reaches a state where it can consume it. The collapse operator may replace all instances of an input action with a single action instance. In some scenarios however, one may wish not to accumulate all instances of the input action, but only a subset thereof up to the point where a milestone is reached. For example, the collapse operation may be used to accumulate all part shipment notifications until an invoice is received, and then generate an output action. The collapse operation may then accumulate the next set of shipment notifications until another invoice is received, and generate another output action, for example.

Figure 8:
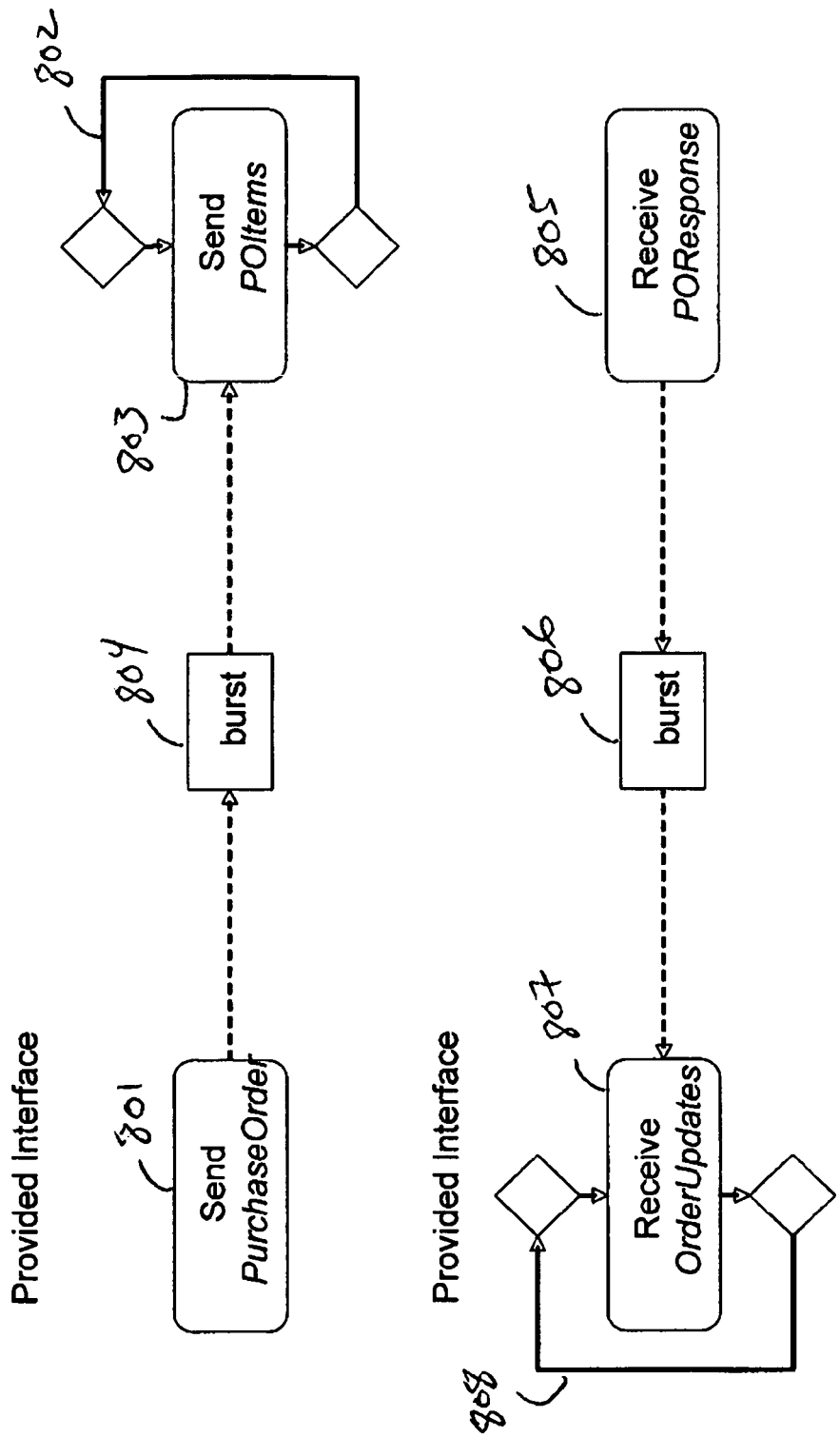
FIG. 8 illustrates a burst operation according to one embodiment of the present invention.

FIG. 8 illustrates a burst operation according to one embodiment of the present invention. The burst operation generates multiple actions from a single action. For example, the burst operation may work in the reverse of the collapse operation and may be used when a single action needs to be split into a stream of actions. The burst operation may be used where a generated stream of actions consists of repeated instances of the same communication action. For example, a provided interface may include a single action "Send Purchase Order" 801, but a required interface may expect to receive multiple actions for each item on a purchase order (e.g., receive POItems) as part of a process flow. Thus, the required interface should include multiple instances of "Send POItems" 803 as part of process flow 802. A burst operation 804 may be used to translate a single action "Send Purchase-Order" into multiple actions "Send POItems." Similarly, a provided interface may expect multiple actions "Receive OrderUpdates" 807 as part of a process flow or loop 808, but another interface may only send a single "POResponse." Thus, the required interface should include only a single instance of "Receive POResponse" 805. A burst operation 806 may be used to translate a single action "Receive PORe-sponse" into multiple actions "Receive OrderUpdates." For example, a burst operation may be configured to split the input action into multiple specified actions. The actions output by the burst operation for a given input may be specified in the adapter specification mentioned above, for example.

Figure 9:
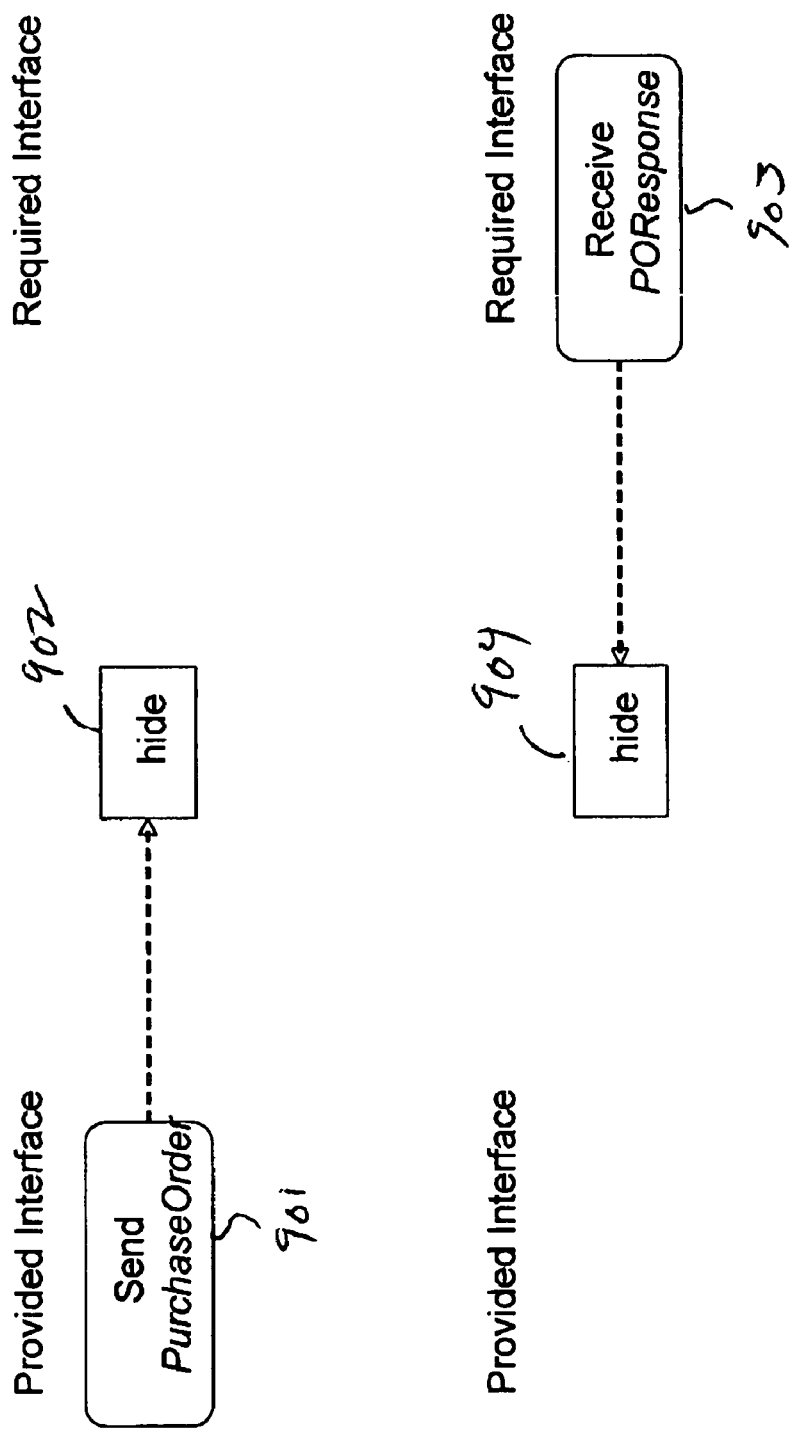
FIG. 9 illustrates a hide operation according to one embodiment of the present invention.

FIG. 9 illustrates a hide operation according to one embodiment of the present invention. The hide operation when one interface includes an action that is not used by the other interface. The hide operation may be used to ignore an action by one interface that is not required in another interface. For example, a provided interface may include an action "Send PurchaseOrder" 901, but a required interface may not used or require the purchase order. Accordingly, a hide operation 902 may be used to hide the send step from the other interface. Similarly, a required interface may include an action that sends a purchase order response ("POResponse") to a provided interface. However, the provided interface may not use or require the response. Thus, a hide operation 904 may be used to generate an interface that implements a "Receive POResponse," but merely hides the action from the provided interface.

Figure 10:
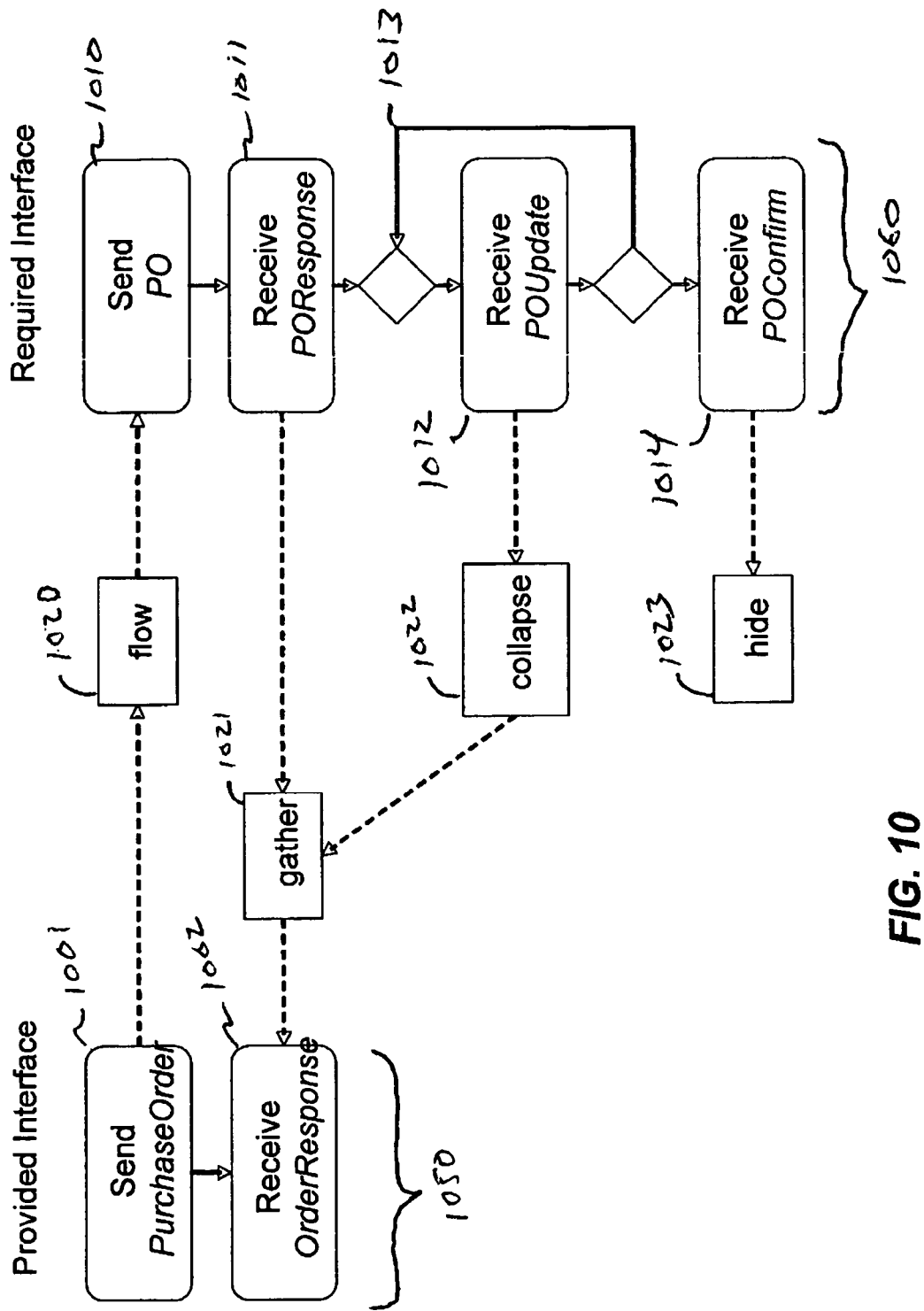
FIG. 10 illustrates adaptation of interfaces according to one embodiment of the present invention.

FIG. 10 illustrates adaptation of interfaces according to one embodiment of the present invention. For example, a first software component, such as a software service, may include a provided interface as illustrated at 1050. A second software component may include another required interface that is not compatible with the interface of the first component. Thus, an adapter may be used to provide a required interface 1060 that matches the interface of the second software component. As illustrated in FIG. 10, the first software component interface 1050 may include an action "Send PurchaseOrder" 1001. However, the second software component may include a "Receive PO" action. A flow operation 1020 may be used to translate the "Send PurchaseOrder" action 1001 into "Send PO" action 1010. The input, output, and function of the flow operation may be specified in the adapter specification, for example. Similarly, the second software component interface may include a step for sending a purchase order response ("POResponse"), multiple steps for sending purchase order updates ("POUpdates"), and a step for sending a purchase order confirmation ("POConfirm"). However, the first software component interface may only include a step for receiving a order response ("OrderResponse"). This example illustrates how multiple predefined interface operations can be combined to translate the second software components interface into the first software components interface. In this example, a gather operation 1021 has a first input coupled to a "Receive POResponse" step 1011 in required interface 1060. A collapse operation has an input coupled to a "Receive POUpdate 1012. Since the required interface includes a process flow 1013 that may include multiple instances of step 1012 (e.g., in a loop), a collapse operation 1022 is used to capture the multiple instances of step 1012 and generate a single action. The output of the collapse operation 1022 is coupled to a second input of the gather operation 1021. When steps 1011 and 1012 are complete, and if the "Receive Order-Response" step 1002 is ready for input, then the gather operation 1021 will provide the matching input to step 1002. Finally, in this example the provided interface 1050 does not require a purchase order confirmation. Thus, a hide operation 1023 is used to provide a "Receive POConfirm" step 1014 in the required interface.

Figure 11:
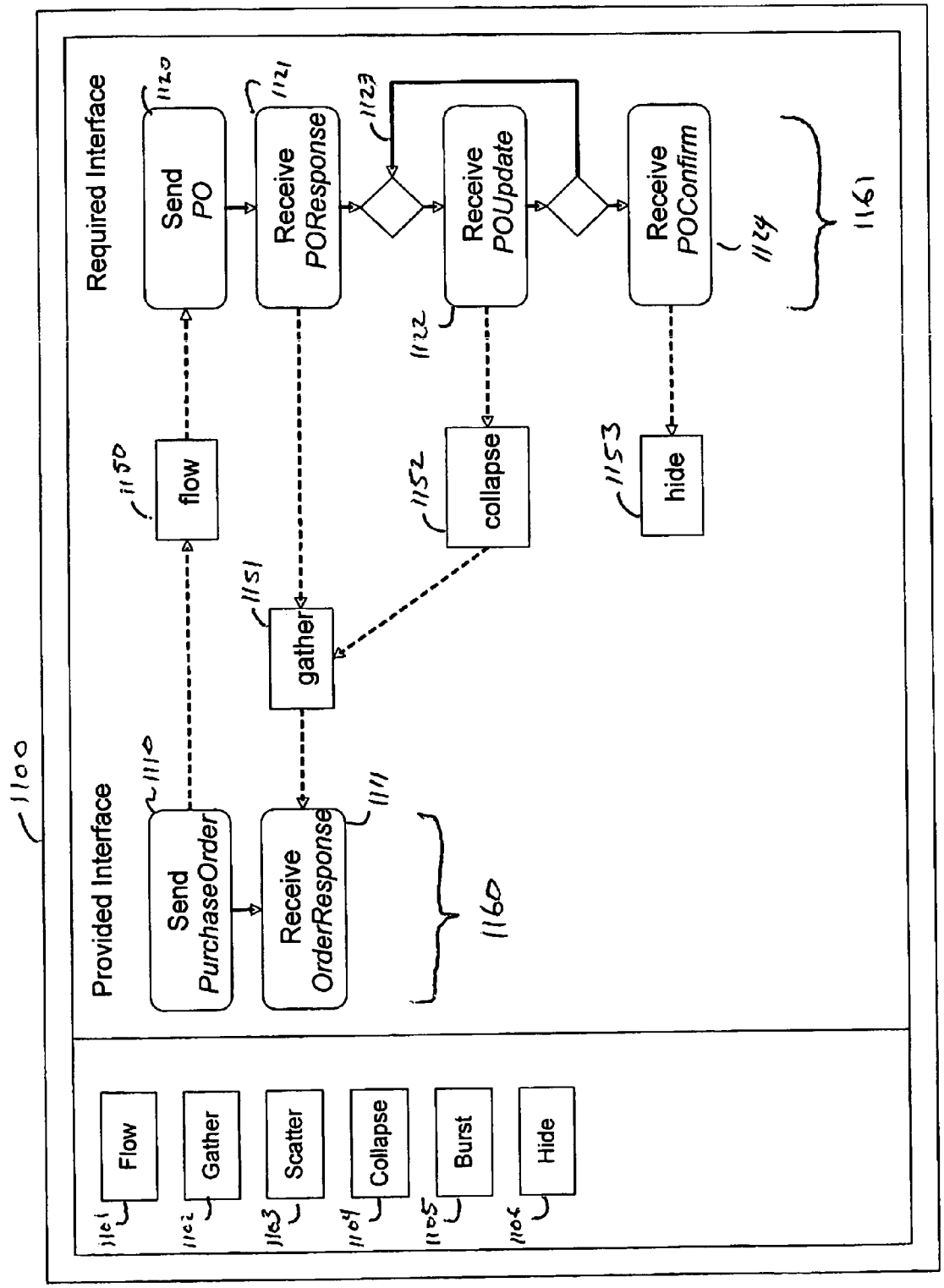
FIG. 11 illustrates interface operators that may be used to specify an adaptation between interfaces according to one embodiment of the present invention.

FIG. 11 illustrates interface operators that may be used to specify an adaptation between interfaces according to one embodiment of the present invention. In one embodiment, the present invention allows a user specify the interfaces of software components to be adapted and to specify interface operations using interface operators that are provided to the user in a user interface. For example, in one embodiment a graphical user interface ("GUI") 1100 includes predefined interface operators 1101-1106 that are displayed to a user (e.g., as icons). Predefined interface operators may include a flow operator 1101 for specifying a flow operation, a gather operator 1102 for specifying a gather operation, a scatter operator 1103 for specifying a scatter operation, a collapse operator 1104 for specifying a collapse operation, a burst operator 1105 for specifying a burst operation, and a hide operator for specifying a hide operation.

A user may first specify the interface 1160 of a first software component (e.g., a provided interface) and then specify the interface 1161 for interfacing with the second software component (e.g., a required interface). For example, a provided interface, or a portion of an interface, may be displayed in the graphical user interface ("GUI") 1100 at 1160. The displayed interface may include a variety of communication actions for the interface. The required interface, or a portion of the interface, may also be displayed in the GUI at 1161. Specifying the adaptation between the interfaces may be done using the predefined interface operators 1101-1106 for adapting communication actions between the first interface and the second interface.

For example, a user may select an interface operator and move the operator between the specified interfaces. A user may specify the adaptation by connecting the input(s) and output(s) of a particular operator to particular communications actions in the provided and required interfaces, and setting parameters for the operator that specify operations in an adapter. For example, a flow operator 1101 may be used to change a "Send PurchaseOrder" action into a "Send PO" action. Accordingly, the flow operator 1150 is selected and moved between the "Send PurchaseOrder" action 1110 and the "Send PO" action 1120. The input of the flow operator 1150 may be coupled to action 1110, and the output of flow 1150 may be coupled to action 1120. Finally, a user may input parameters into the flow operator that define how this particular instance of the flow operator will translate actions between the two interfaces in the adapter. Similarly, the gather operator 1102 may be used to receive both the purchase order responses ("POResponse") and multiple purchase order updates ("POUpdate"). Thus, gather operator 1151 is selected and moved between the "Receive POResponse" action 1121 and the "Receive OrderResponse" action 1111. A user may the couple the input of the gather operator to action 1121 and couple the output of the gather operator to action 1111. Additionally, a collapse operator 1104 is used to generate a single action from multiple instances of the "Receive POUpdate" action 1122 in process flow 1123. The collapse operator 1152 is selected and moved between action 1122 and the input of gather operator 1151. The input of collapse operator 1152 is coupled to action 1122 and the output of collapse operator is coupled to the input of gather operator 1151. Accordingly gather operator 1151 specifies a gather operation that receives "POResponse" 1121 and a single action from a collapse operation 1151 and generates an output for the "Receive OrderResponse" action 1111. Finally, in this example a "POConfirm" is not used by the provided interface. Accordingly, a hide operator 1153 has an input coupled to the "Receive POConfirm" action absorb action 1124.

The GUI may be used to specify the provided interface, the required interface, and the interface operators that may be used to adapt the two interfaces as illustrated in FIG. 11. An adapter specification may be generated from the specified interfaces and interface operators. The GUI and adapter specification generator may be included in the same software, but could be separated into different software components. The adapter specification may include information corresponding to the provided interfaces, the required interface, the specific interface operators, and configuration information for each instance of an interface or interface operator. The adapter specification may be a single item, such as a file, or the information contained therein may be partitioned into many different items. Behavioral interfaces may be represented as BPEL abstract processes supplemented by their corresponding WSDL types and endpoint definitions, for example. Data manipulation functions may be expressed in XSLT, for example.

Figure 12:
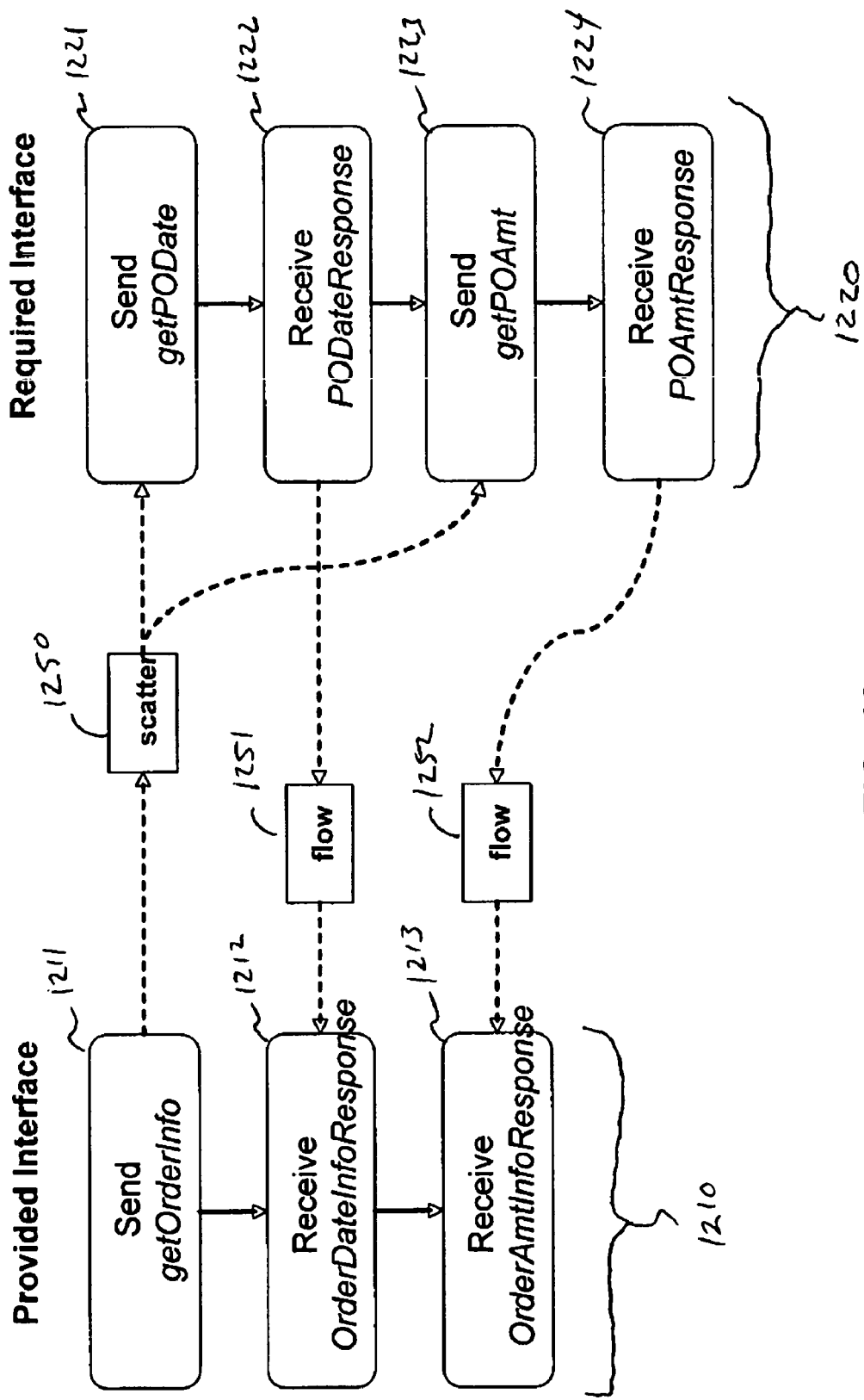
FIG. 12 is another example of interface operations that may be used to adapt interfaces according to one embodiment of the present invention.

FIG. 12 is another example of interface operations that may be used to adapt interfaces according to one embodiment of the present invention. This example may apply to two software services with different interfaces. In this example, a provided interface 1210 first requests all the information about an order, and then receives date information and amount information in separate actions. For example, interface 1210 includes a "Send getOrderInfo" action 1211 (i.e., send a request to get information about an order), a "Receive OrderDateInfoResponse" action 1212 (i.e., receive date information about the order), and a "Receive OrderAmtInfoResponse" action 1213 (i.e., receive amount information about the order). However, an interface on another software service may receive and send the date first, and then receive and send the amount separately. Accordingly, the required interface 1220 includes "Send getPODate" action 1221, "Receive PODateResponse" action 1222, "Send getPOAmt" 1223, and receive POAmtResponse 1224.

As mentioned above, the graphical representation may be used to generate an adapter specification for configuring an adapter to perform corresponding interface operations. In this example, a scatter operation 1250 has been specified to translate the "Send getOrderInfo" action 1211 into two actions— "Send getPODate" action 1221 and "Send getPOAmt" action 1223. A flow operation 1251 is used to conform the "Receive PODateResponse" action 1222 in the required interface with the "Receive OrderDateInfoResponse" action 1212. Similarly, another flow operation 1252 is used to conform the "Receive POAmtResponse" action 1224 in the required interface with the "Receive OrderAmtInfoResponse" action 1213 in the provided interface.

Figure 13:
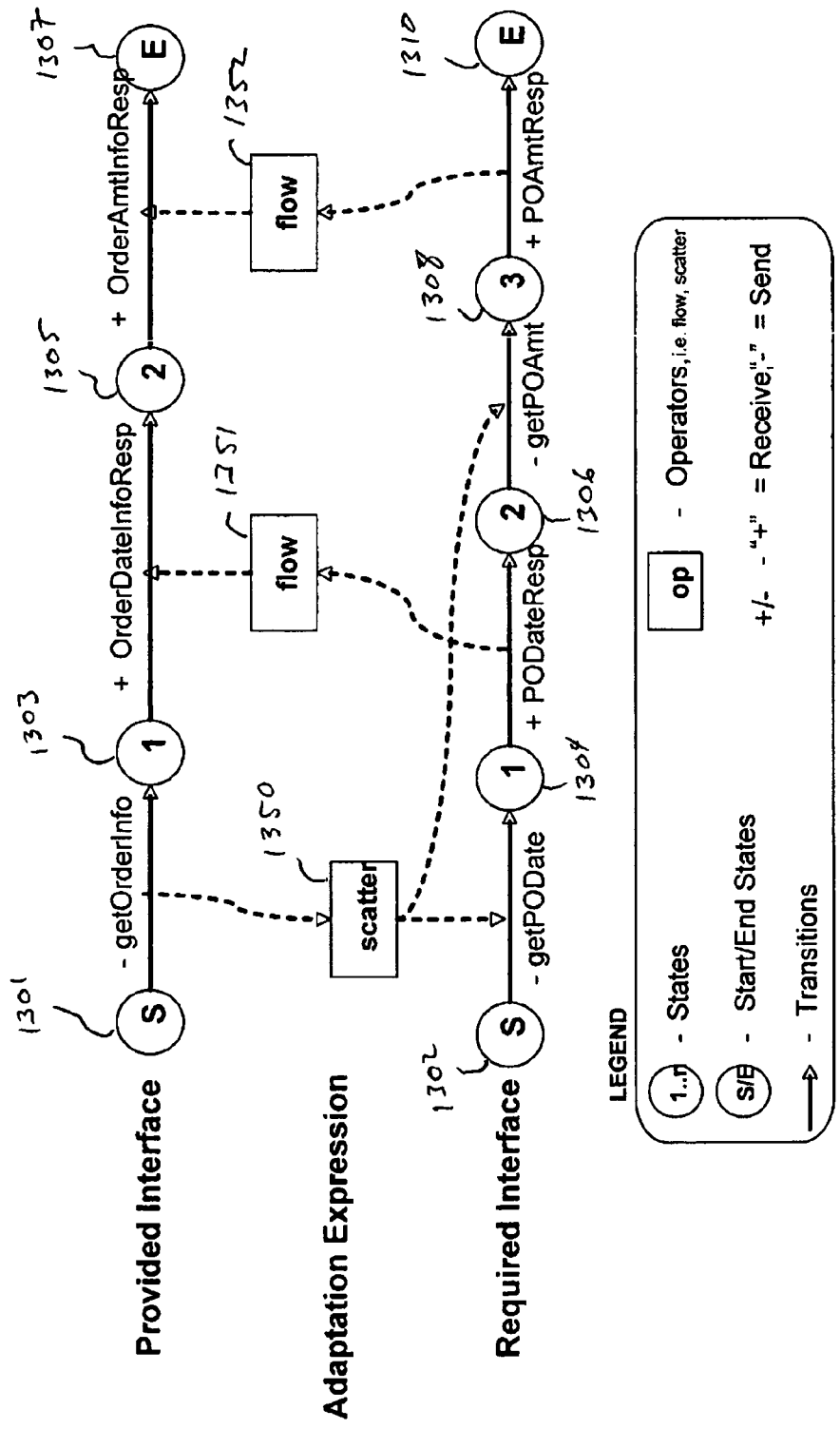
FIG. 13 illustrates a state diagram showing how interface operations are used in an adapter according to one embodiment of the present invention.

FIG. 13 illustrates a state diagram showing how interface operations are used in an adapter according to one embodiment of the present invention. In this example, the behavioral interfaces are represented as Finite State Machines ("FSMs") whose transitions are labelled by communication actions. Such FSMs capture the information needed to execute the interface operations. In one example embodiment, a software component may convert a BPEL representation of the process into the FSMs, which may be used to perform the operations. The process in the provided interface starts at a start state 1301. When the process transitions from state 1301 to state 1303, a "getOrderInfo" action is performed. For example, a message "getOrderInfo" may be intercepted by the adapter, and the scatter operation may be performed to generate "getPODate" and "getPOAmt" as specified by the adapter specification. The conforming message "getPODate" is then forwarded to the interface of another software service, and "getPOAmt" is buffered for further action. The required interface process, which starts at 1302 may now provide the required action as it transitions to state 1304. When the required interface receives "PODateResponse" the process transitions from state 1304 to 1306. A flow operation 1351 translates the "PODateResponse" into "OrderDateInfoResponse," and the provided interface transitions from state 1303 to state 1305. In the required interface, the second output of the scatter operation 1350 is used to generate a "getPOAmt," and the process transitions from state 1306 to 1308. When "POAmtResponse" is received, the process transitions from state 1308 to end state 1310. A flow operation is used to conform "POAmtResponse" to "OrderAmtInfoResponse," and the provided interface transitions from state 1305 to end state 1307.

Figure 14:
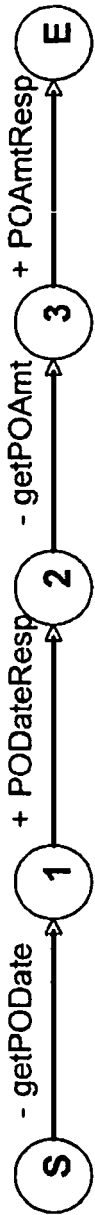
FIGS. 14 and 15 are example representations of the provided and required interfaces according to one embodiment of the present invention.
Figure 15:
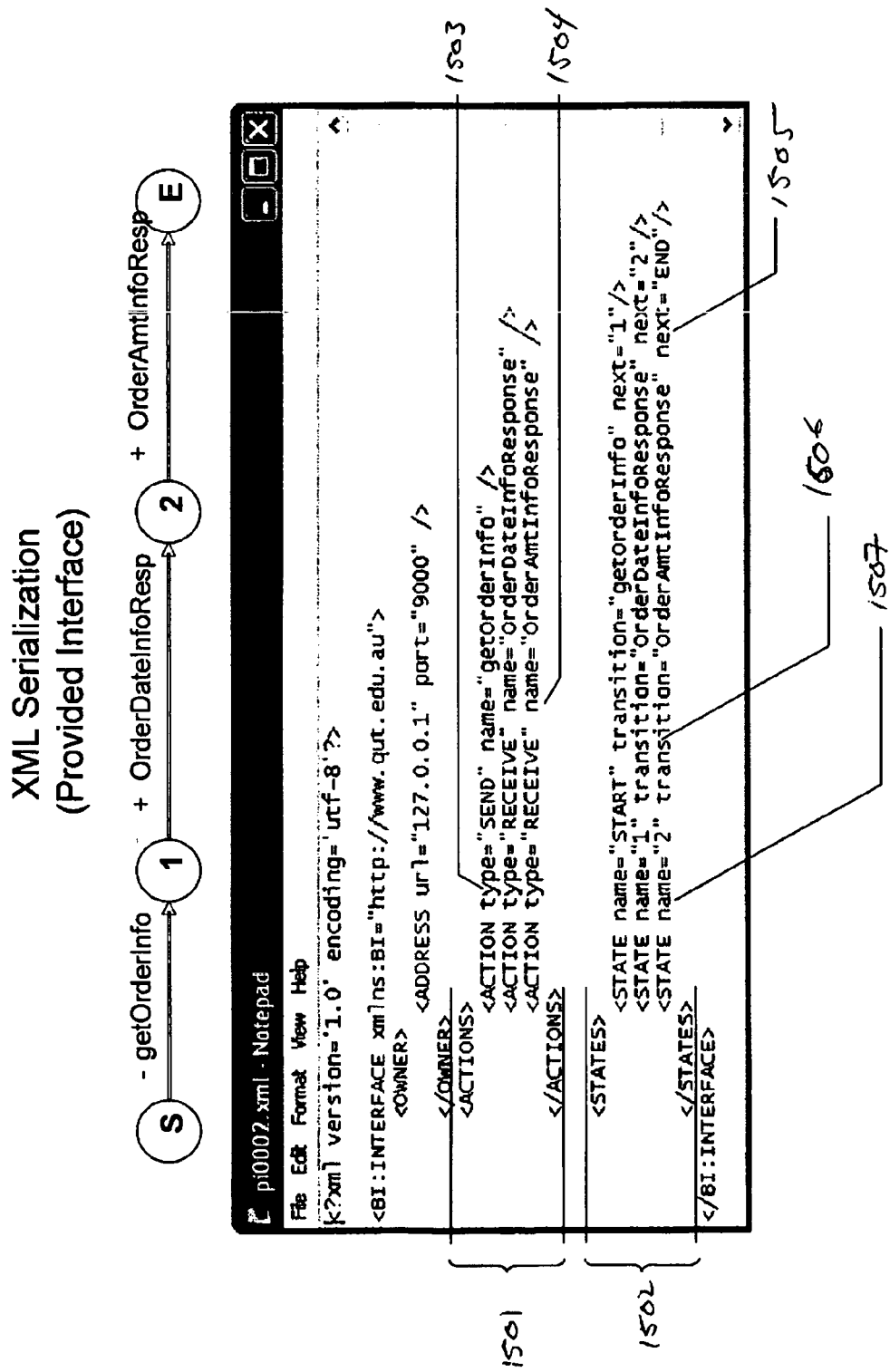

FIGS. 14 and 15 are example representations of the provided and required interfaces according to one embodiment of the present invention. FIG. 14 illustrates a required interface implemented as an XML file. The actions are illustrated at 1401. The states of the interface are illustrated at 1402. FIG. 15 illustrates a provided interface implemented as an XML file. Actions for the provided interface are illustrated at 1501, and states for the required interface are illustrated at 1502. Action types are specified at 1503. Action types may be "send" or "receive," for example. Action names are specified at 1504. States may be named, as illustrated at 1507. Conditions may be specified at 1506. Additionally, next states may be specified at 1505.

FIG. 16 is an example representation of adapter expressions according to one embodiment of the present invention. In this example, the adapter specification is expressed in XML. References to the provided and required interfaces are represented at 1601. Interface operators that define interface operations are represented at 1602. This example illustrates representations of a scatter operator 1610, a flow operator 1620, and another flow operator 1630. Each interface operator specification includes an "operator" specification 1603 (e.g., flow, gather, scatter, collapse, burst, or hide). The inputs may be specified as sources 1604, which are the actions the operator takes as an input. The outputs may be specified as targets 1605, which are the generated outputs of the operators. Additionally, inputs and outputs may further include a type 1606. In this example, the inputs and outputs are SOAP messages. The name of the message is specified at 1607. The operations carried out by an interface operator may be specified as functions. In this example, the function type 1609 may be XSLT or XQuery, for example. The function definition is provided by source 1608. In this example, interface operations are specified using XSLT (i.e., ".xsl" files).

Figure 17:
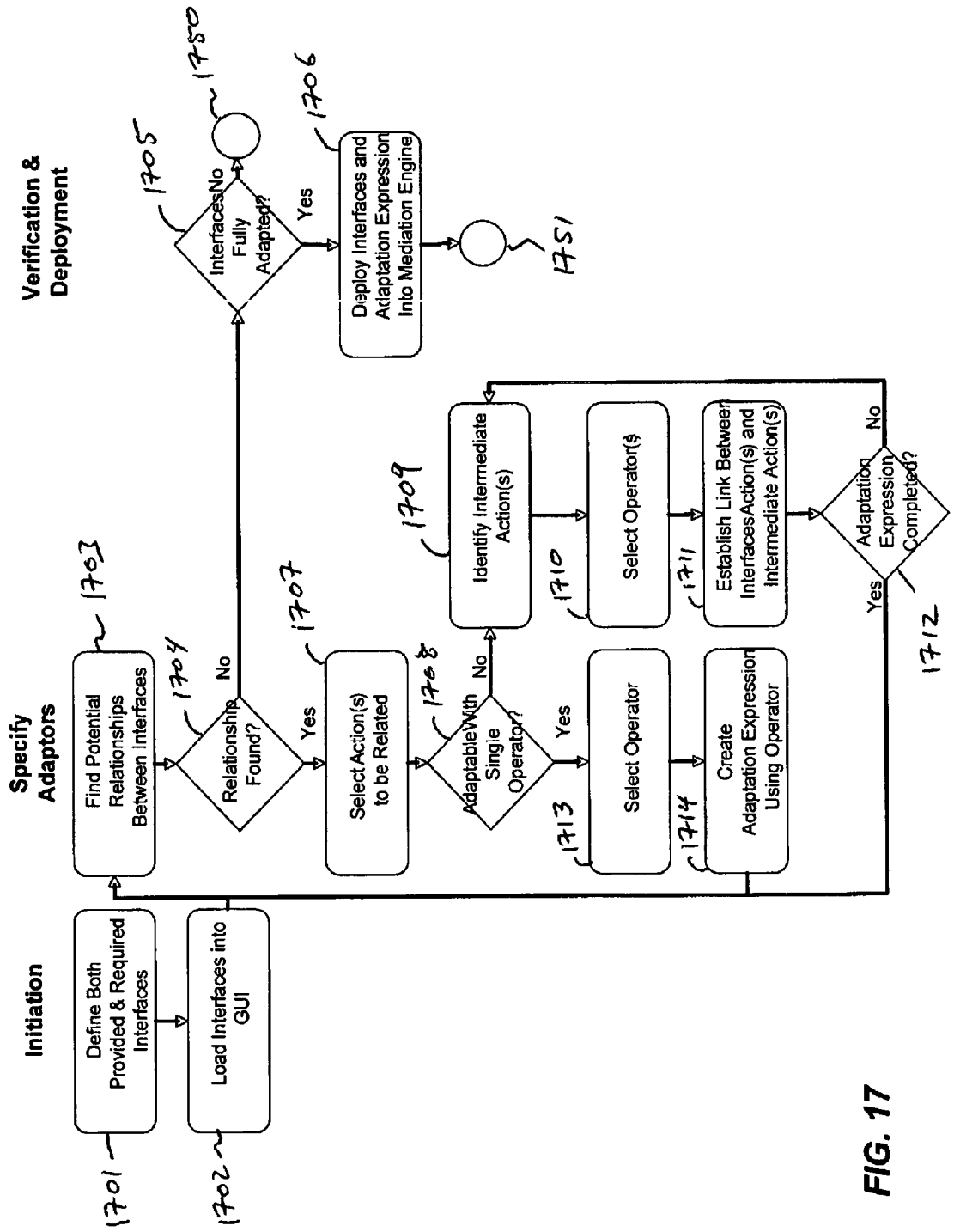
FIG. 17 is an example process for specifying interfaces and interface operators according to one embodiment of the present invention.

FIG. 17 is an example process for specifying interfaces and interface operators according to one embodiment of the present invention. Initially, a user may specify the definitions of the provided and required interfaces at 1701. At 1702, the interfaces may be loaded into the GUI. At 1703, potential relationships between the interfaces may be found. If no relationship is found at 1704, and if the interface is not fully adapted at 1705, then no adaptation may be possible. However, if a relationship is found, then actions to be related may be selected at 1707. If the desired actions are adaptable with a single interface operator at 1708, then a particular interface operator is selected at 1713, and the adapter expression may be created by configuring the interface operator inputs, outputs, and parameters at 1714. If multiple operators are required, intermediate actions may be identified at 1709. For example, in FIG. 11 a single intermediate action was generated from multiple instances of an action 1122 using the "collapse" operator. Operators may be cascaded as needed to adapt interfaces. More complex interfaces may require more complex networks of cascaded interface operators to implement an adaptation. At 1710, interface operators are selected. At 1711, links between an interface and an interface operator's inputs and outputs, or between cascaded operators, are established. If the adaptation expression specified by the interface operators is complete at 1712, then new relationships between other actions are determined at 1703. When all relationships between actions that require adaptation have been determined, and the interface is fully adapted at 1705, then the interfaces and adaptation expressions may be deployed at 1706 into a mediation engine, for example.

Figure 18:
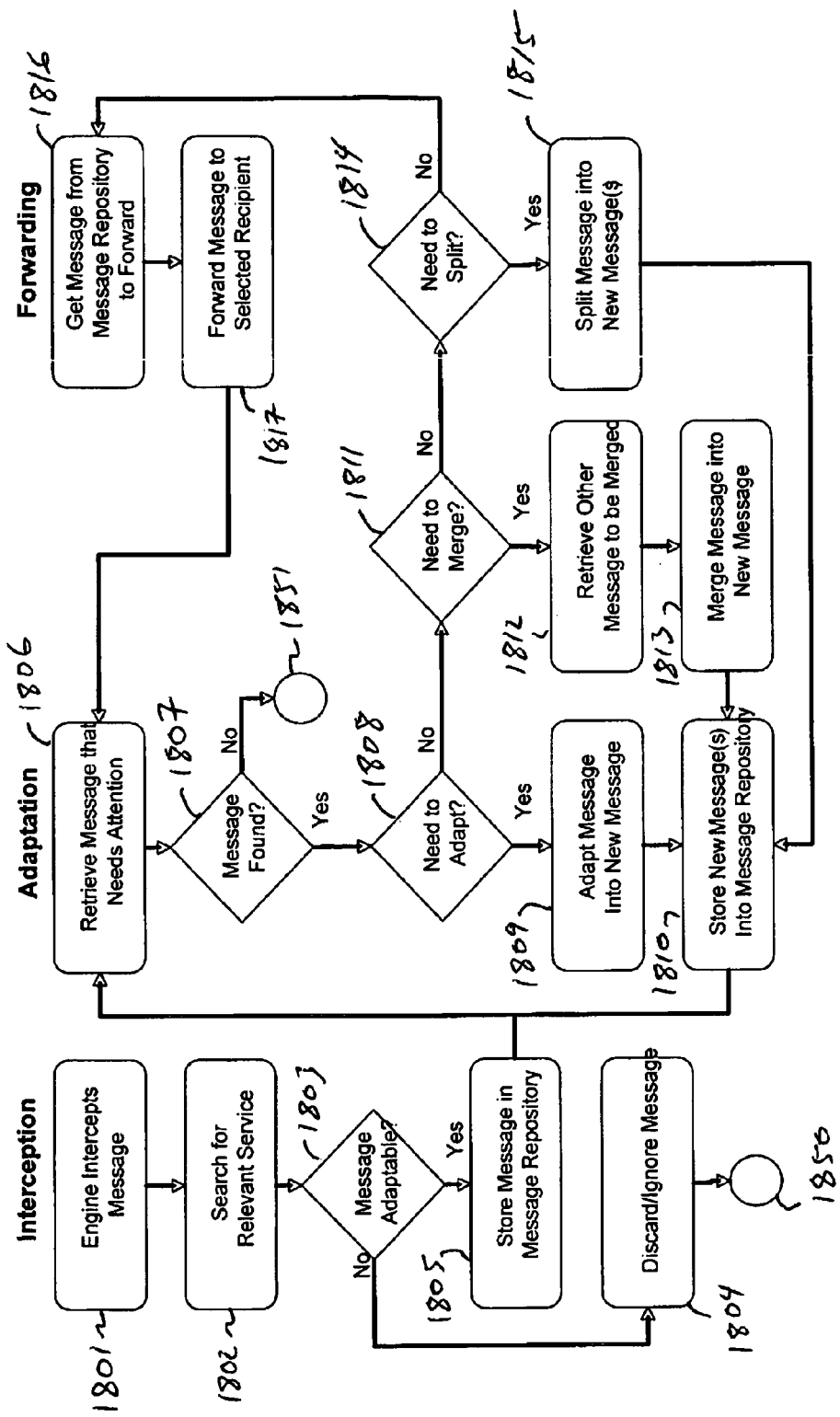
FIG. 18 is an example process for adapting interfaces according to one embodiment of the present invention.

FIG. 18 is an example process for adapting interfaces according to one embodiment of the present invention. In one example implementation, adaptation may be done using an adapter engine software system. For example, at 1801, the engine may intercept a message. At 1802, the engine may search for relevant services corresponding to the message. If the message is adaptable (or compatible), then the message is stored in a repository at 1805. However, if the message is not adaptable or compatible, then if may be discarded or ignored at 1804. At 1806, the message may be retrieved. If the message is found at 1807, and requires adaptation at 1808, then the message is adapted at 1809 into a new message using interface operations. The new message may be stored into a message repository at 1810. If a message needs to be merged with another message at 1811 (e.g., a message with multiple inputs and only one output, then the other message to be merged is retrieved at 1812, and the messages are merged to create a new message at 1813 and stored in a message repository at 1810. If a message needs to be split at 1814 (e.g., a message with one input and multiple outputs), then the message is split into multiple new messages at 1815 and stored in a message repository at 1810. Messages that are fully adapted may be retrieved from the message repository at 1816 and forwarded to the recipient at 1817. It is to be understood that this is just one possible implementation of an adapter engine. Adapter engines implementing interface operations to adapt interfaces may be implemented in software using a variety of techniques for implementing the interface operations between interface actions.

Figure 19:
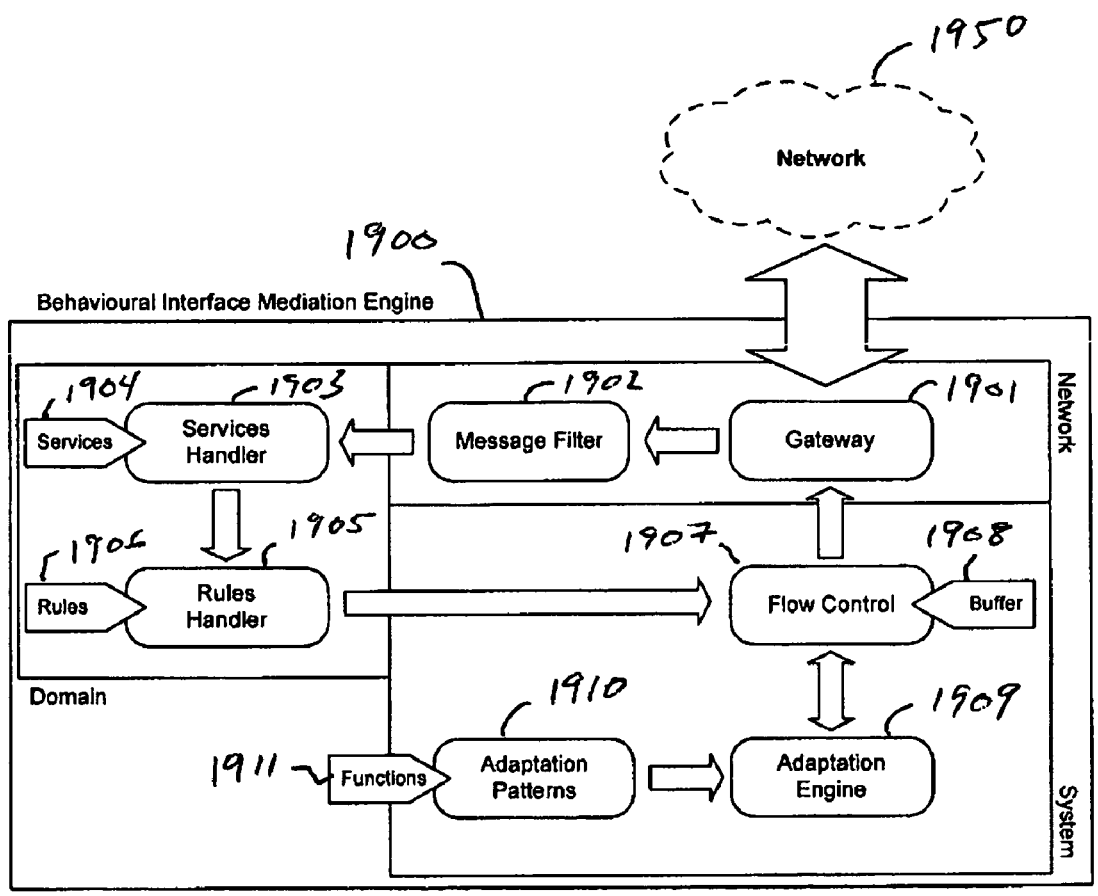
FIG. 19 is an example adapter engine according to one embodiment of the present invention.

FIG. 19 is an example adapter engine according to one embodiment of the present invention. Example adapter engine 1900 may include a gateway 1901 for receiving messages over a network 1950. Network 1950 may be a local network, an intranet, or the Internet, for example. Received messages may be passed through a message filter 1902, and provided to a service handler 1903. The service handler identifies the service related to the message from the service repository 1904 in order to retrieve the correct service instance. This information may be passed to the rules handler 1905 to determine the type of adaptation required which is specified by rules 1906. The message, the service instance and the rules 1906 may then be passed to the flow control 1907, which in turn determines whether any adaptation is necessary, or simply returns the message to the gateway 1901, which may then forward it to the recipient through the network 1950. If adaptation is required, the message may then be passed to the adaptation engine 1909. The adaptation engine 1909 performs the adaptation as specified by the rules 1906. This adaptation leads to one or several new messages that may then be returned to the flow control 1907. The flow control 1907 may save the new message(s) into the buffer 1908. If one or several of the new message(s), or other messages previously stored in the buffer 1908, is (are) ready for sending, the flow control 1907 may pass the relevant messages to the gateway 1901, which may then forward it (them) to the recipient through the network 1950.

Figure 20:
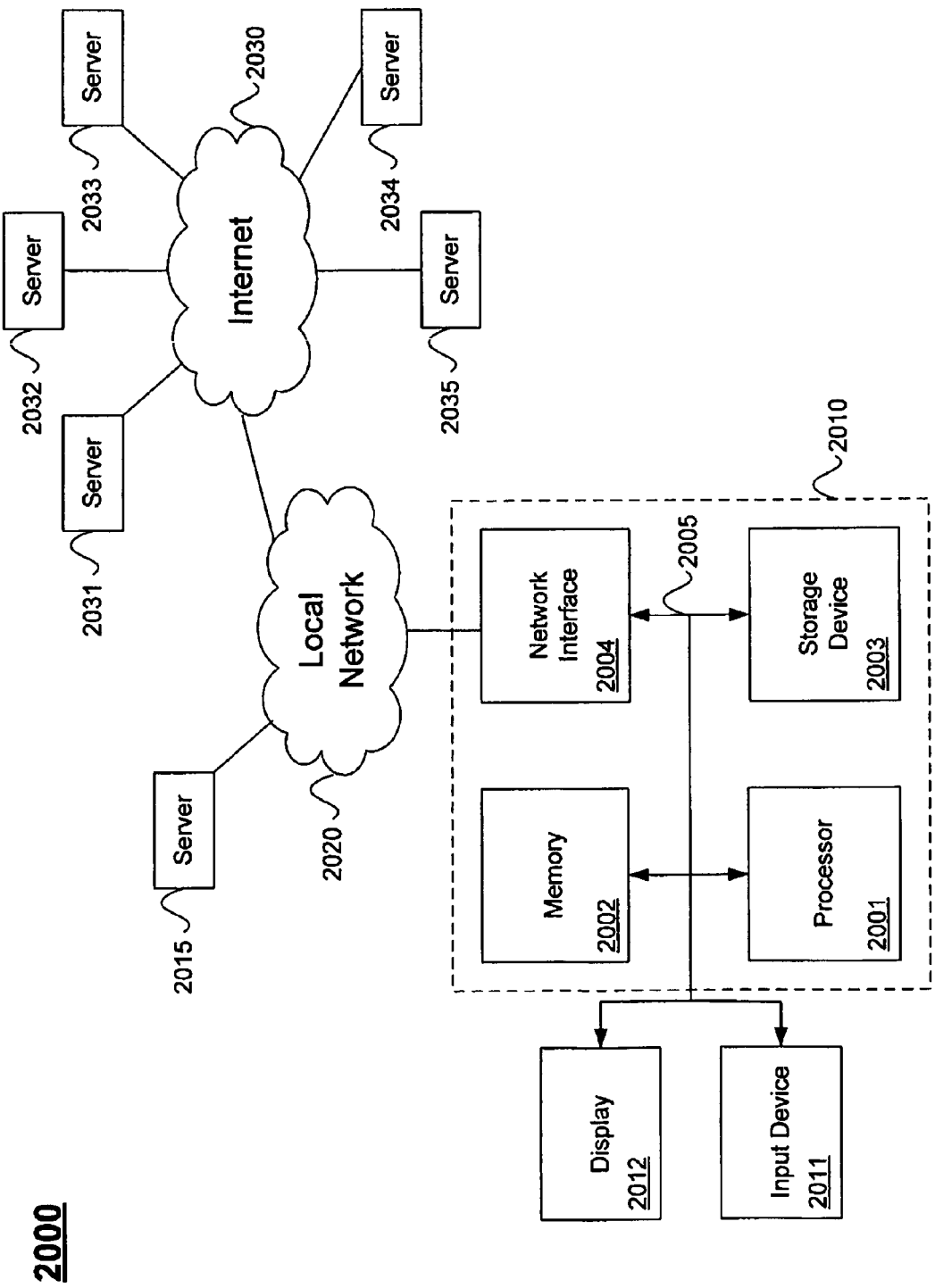
FIG. 20 illustrates an example computer system and networks that may be used to implement the present invention.

FIG. 20 illustrates an example computer system and networks that may be used to implement the present invention. Computer system 2010 includes a bus 2005 or other communication mechanism for communicating information, and a processor 2001 coupled with bus 2005 for processing information. Computer system 2010 also includes a memory 2002 coupled to bus 2005 for storing information and instructions to be executed by processor 2001, including instructions for performing the techniques described above. This memory may also be used for storing temporary variables or other intermediate information during execution of instructions to be executed by processor 2001. Possible implementations of this memory may be, but are not limited to, random access memory (RAM), read only memory (ROM), or both. A storage device 2003 is also provided for storing information and instructions. Common forms of storage devices include, for example, a hard drive, a magnetic disk, an optical disk, a CD-ROM, a DVD, a flash memory, a USB memory card, or any other medium from which a computer can read.

Computer system 2010 may be coupled via bus 2005 to a display 2012, such as a cathode ray tube (CRT) or liquid crystal display (LCD), for displaying information to a computer user. An input device 2011 such as a keyboard and/or mouse is coupled to bus 2005 for communicating information and command selections from the user to processor 2001. The combination of these components allows the user to communicate with the system.

Computer system 2010 also includes a network interface 2004 coupled with bus 2005. Network interface 2004 may provide two-way data communication between computer system 2010 and the local network 2020. The network interface 2004 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2004 sends and receives electrical, electromagnetic, or optical signals that carry digital data streams representing various types of information.

Computer system 2010 can send and receive information, including messages or other interface actions, through the network interface 2004 to an Intranet or the Internet 2030. In the Internet example, software components or services may reside on multiple different computer systems 2010 or servers 2031 across the network. Adapters described above may be implanted on one or more servers. A server 2031 may transmit actions or messages from one component, through Internet 2030, local network 2020, and network interface 2004 to a component on computer system 2010. Adapters may be implemented on the same system as the either component, or on a different machine than either component. The actions or messages may then be sent to the processor 2001 via bus 2005 for adaptation. The received information may then be processed by processor 2001 and/or stored in storage device 2003, or other non-volatile storage for later execution. This process of sending and receiving information may be applied to communication between computer system 2010 and any of the servers 2031 to 2035 in either direction. It may also be applied to communication between any two servers 2031 to 2035.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A computer-implemented method of adapting software service interfaces comprising:
specifying, in a graphical user interface, at least a portion of a first software service interface for a first software service, at least a portion of a second software service interface for a second software service, and one or more interface operators corresponding to one or more interface operations, wherein the specified first software service interface, second software service interface, and one or more interface operators are displayed to a user;
generating an adapter specification from the specified first software service interface, second software service interface, and one or more interface operators;
receiving a plurality of messages from the first software service, the first software service having the first software service interface for sending and receiving the plurality of messages according to a first predefined sequence of transactions;
transforming one or more of the messages in accordance with said interface operations; and
sending the transformed messages to the second software service, the second software service having the second software service interface for sending and receiving messages according to a second predefined sequence of transactions that is different from the first predefined sequence of transactions,
wherein the adapter specification specifies said one or more interface operations for transforming one or more corresponding messages so that the first and second software service interface sequences are compatible.

2. The method of claim 1 wherein the adapter specification programs an adapter software component to provide communications between the first and second software services.

3. The method of claim 1 wherein the adapter specification specifies a flow operation.

4. The method of claim 1 wherein the adapter specification specifies a gather operation.

5. The method of claim 1 wherein the adapter specification specifies a scatter operation.

6. The method of claim 1 wherein the adapter specification specifies a collapse operation.

7. The method of claim 1 wherein the adapter specification specifies a burst operation.

8. The method of claim 1 wherein the adapter specification specifies a hide operation.

9. The method of claim 1 wherein the adapter specification specifies one or more of a flow operation, a gather operation, a scatter operation, a collapse operation, a burst operation, and a hide operation between one or more messages between the first software service and the second software service.

10. The method of claim 1 wherein the interface operators are selected from the group consisting of a flow operator, a gather operator, a scatter operator, a collapse operator, a burst operator, and a hide operator.

11. A computer-implemented method of adapting interfaces comprising:
displaying at least a portion of a first software service interface in a graphical user interface, the first software service interface specifying a first predefined sequence of transactions for sending and receiving a plurality of messages;
displaying at least a portion of a second software service interface in the graphical user interface, the second software service interface specifying a second predefined sequence of transactions for sending and receiving a plurality of messages;
displaying a plurality of predefined interface operators for adapting messages sent between the first software service interface and the second software service interface,
wherein a user selects one or more predefined interface operators and couples one or more of the selected predefined interface operators between one or more particular transactions in the first software service interface and one or more particular transactions in the second software service interface;
generating an adapter specification based on the one or more selected predefined interface operators; and
transforming one or more messages sent between the first and second software service interfaces so that the first and second software service interfaces are compatible.

12. The method of claim 11 wherein the plurality of predefined interface operators includes a flow operator.

13. The method of claim 11 wherein the plurality of predefined interface operators includes a gather operator.

14. The method of claim 11 wherein the plurality of predefined interface operators includes a scatter operator.

15. The method of claim 11 wherein the plurality of predefined interface operators includes collapse operator.

16. The method of claim 11 wherein the plurality of predefined interface operators includes a burst operator.

17. The method of claim 11 wherein the plurality of predefined interface operators includes a hide operator.

18. The method of claim 11 wherein the interface operators are selected from the group consisting of a flow operator, a gather operator, a scatter operator, a collapse operator, a burst operator, and a hide operator.

* * * * *